(12) United States Patent
Joshi et al.

(10) Patent No.: US 10,371,064 B2
(45) Date of Patent: Aug. 6, 2019

(54) METHOD AND SYSTEM TO INCREASE GAS TURBINE ENGINE DURABILITY

(71) Applicant: General Electric Company, Schenectady, NY (US)

(72) Inventors: Narendra Digamber Joshi, Schenectady, NY (US); Krishan Lal Luthra, Guilderland, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 661 days.

(21) Appl. No.: 15/041,710

(22) Filed: Feb. 11, 2016

(65) Prior Publication Data

US 2016/0252019 A1 Sep. 1, 2016

Related U.S. Application Data

(60) Provisional application No. 62/121,214, filed on Feb. 26, 2015.

(51) Int. Cl.
*F02C 9/20* (2006.01)

(52) U.S. Cl.
CPC ............ *F02C 9/20* (2013.01); *F05D 2270/11* (2013.01); *F05D 2270/303* (2013.01)

(58) Field of Classification Search
CPC ... F02C 9/20; F05D 2270/11; F05D 2270/303
USPC ........................................................ 60/779
See application file for complete search history.

(56) References Cited

U.S. PATENT DOCUMENTS

| | | | |
|---|---|---|---|
| 4,767,259 A * | 8/1988 | Kurosawa | F01P 7/026 415/17 |
| 7,284,377 B2 | 10/2007 | Joshi et al. | |
| 8,109,464 B2 | 2/2012 | Bhargava | |
| 8,205,331 B2 | 6/2012 | Braly | |
| 8,327,538 B2 | 12/2012 | Wang et al. | |
| 8,572,983 B2 | 11/2013 | Xu | |
| 2009/0235638 A1 | 9/2009 | Jain et al. | |
| 2011/0037276 A1 * | 2/2011 | Hoffmann | F02C 9/22 290/40 C |
| 2012/0324903 A1 | 12/2012 | Dewis et al. | |
| 2013/0139519 A1 | 6/2013 | Kesseli et al. | |

(Continued)

OTHER PUBLICATIONS

Ray, A et al., "Damage-mitigating control: an interdisciplinary thrust between controls and material science"; American Control Conference, 1994, IEEE Xplore; Jun. 29-Jul. 1, 1994; vol. 3, pp. 3449-3453.

(Continued)

*Primary Examiner* — Steven Sutherland
(74) *Attorney, Agent, or Firm* — GE Global Patent Operation; Nitin Joshi (57) ABSTRACT

A method of operating a gas turbine engine includes measuring an exhaust gas temperature of the gas turbine engine. A first stage turbine nozzle assembly of the gas turbine engine is adjusted to a first position. A firing temperature of the gas turbine engine is determined based on the exhaust gas temperature. The firing temperature is compared to a threshold value and a difference value is determined therefrom. If the difference value exceeds a threshold value, the first stage turbine nozzle assembly is adjusted to a second position such that the firing temperature is substantially equal to the threshold value.

17 Claims, 7 Drawing Sheets

(56) References Cited

U.S. PATENT DOCUMENTS

2014/0154046 A1  6/2014  Hensley et al.

OTHER PUBLICATIONS

Guo Ten-Huel, "A roadmap for aircraft engine life extending control"; American Control Conference, 2001. Proceedings of the 2001, IEEE Xplore; Jun. 25-27, Jun. 2001; vol. 5, pp. 3702-3705.

* cited by examiner

METHOD AND SYSTEM TO INCREASE GAS TURBINE ENGINE DURABILITY

CROSS-REFERENCE TO RELATED APPLICATIONS

This application claims the benefit of U.S. Provisional Application No. 62/121,214, filed Feb. 26, 2015, herein incorporated by reference in its entirety.

BACKGROUND

The subject matter described herein relates generally to gas turbine engines, and more specifically, to systems and methods for increasing the durability of the gas turbine engine by increasing mass flow during its service life.

Most known gas turbine engines, for example, aircraft engines, are designed to exacting standards. For example, such engines are manufactured with about a 50 degree Celsius (° C.) margin to a maximum exhaust temperature (T8) limit. As such known gas turbine engines age, they generate less output power, or thrust, at a given firing temperature. Generally, the engine controller will increase the firing temperature in order to generate the desired output power for take-off. Thus, in a normal course of engine use, the exhaust gas temperature will increase. Between approximately 3000 to 5000 cycles, or between approximately 10,000 and 30,000 hours, the T8 margin decreases to about 0° C. At this point, the engine is taken out of service for repairs or overhaul.

In such known engines, the exhaust temperature increase is in part due to engine component deterioration, resulting in a reduction in efficiency of one or more of the compressor, the turbine, and the fan. As the exhaust gas temperature rises, the combustor discharge temperature also rises. The relationship between the combustor discharge temperature and the exhaust gas temperature is within the range of about 2:1 and about 2.3:1, depending on the pressure ratio of the specific gas turbine engine. Thus, for a 50° C. rise in exhaust gas temperature, the combustor discharge temperature rises within the range between about 100° C. and about 115° C. Thus, the durability of the hot gas path components (e.g., turbine nozzles vanes and turbine buckets) is significantly affected by this increase in temperature. Some known gas turbine engine components have a cooling effectiveness rate of about 0.5, meaning that the component temperatures in the high pressure turbine increase approximately between about 50° C. and about 58° C. This temperature increase results in a decrease in component life by about a factor of 8 because, in general, for every 11° C. increase in metal temperature, the component life decreases by a factor of 2. Thus, as known gas turbine engines age, the high pressure turbine components experience a decrease in service life at an increased rate.

Thus, known gas turbine engines degrade at increasing rates as the engines age. The result of engine deterioration and degradation is an increase in exhaust gas temperature and a corresponding increase in turbine firing temperature. Both of these increased temperatures increase the rate at which the gas turbine engine deteriorates, leading to the removal of the engine for repairs.

BRIEF DESCRIPTION

In one aspect, a method of operating a gas turbine engine is provided. The method includes measuring an exhaust gas temperature of the gas turbine engine. A first stage turbine nozzle assembly is adjusted to a first position. The method also includes determining a firing temperature of the gas turbine engine based on the exhaust gas temperature. In addition, the method includes comparing the firing temperature to a threshold value and determining a difference value therefrom. Furthermore, the method includes determining that the difference value exceeds the threshold value. Moreover, the method includes adjusting the first stage turbine nozzle assembly to a second position such that the firing temperature is substantially equal to the threshold value.

In another aspect, a method of operating a gas turbine engine is provided. The method includes operating the gas turbine engine at a first condition to generate a first power output. The method also includes measuring an exhaust gas temperature of the gas turbine engine. Moreover, the method includes determining a firing temperature of the gas turbine engine based on the measured exhaust gas temperature. The firing temperature is compared to a threshold value and a difference value is determined therefrom. The method also includes determining that the difference value exceeds the threshold value. Furthermore, the method includes derating the first power output of the gas turbine engine to a second power output. The gas turbine engine is at a second condition such that the firing temperature is substantially equal to the threshold value.

In another aspect, a system for operating a gas turbine engine is provided. The system includes a gas turbine engine having a first stage turbine nozzle assembly. The system also includes a controller configured to control operation of the gas turbine engine. The controller includes a processor programmed to measure an exhaust gas temperature of the gas turbine engine. The first stage turbine nozzle assembly is adjusted to a first position. The processor is also programmed to determine a firing temperature of said gas turbine engine based on the exhaust gas temperature. Furthermore, the processor is programmed to compare the firing temperature to a threshold value and determine a difference value therefrom. Moreover, the processor is programmed to determine that the difference value exceeds the threshold value, and adjust said first stage turbine nozzle assembly to a second position such that the firing temperature is substantially equal to the threshold value.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "axial" and "axially" refer to directions and orientations extending substantially parallel to a longitudinal axis of a gas turbine engine. The terms "radial" and "radially" refer to directions and orientations extending substantially perpendicular to the longitudinal axis of the gas turbine engine. In addition, as used herein, the terms "circumferential" and "circumferentially" refer to directions and orientations extending arcuately about the longitudinal axis of the gas turbine engine. Moreover, "upstream" refers to a forward end of the gas turbine engine, and "downstream" refers to an aft end of the gas turbine engine.

As used herein, the term "core engine" will be used to refer to that portion of the gas turbine engine extending from the high pressure compressor forward flange back to the low pressure turbine. The core engine includes both the engine casing or stator and the rotating components positioned radially inwardly from the stator.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program stored in memory for execution by personal computers, workstations, clients and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The term "parameter" refers to characteristics that can be used to define the operational conditions of the gas turbine engine, such as temperatures, pressures, and/or fluid flows at defined locations within the gas turbine engine. Some parameters are measured, i.e., are sensed and are directly known, while other parameters are calculated and are thus estimated and indirectly known. Some parameters may be initially input by a user to a controller. The measured, estimated, or user input parameters represent a given operational condition of the gas turbine engine.

The methods and systems described herein facilitate increasing the durability of a gas turbine engine by increasing a mass flow of a fluid flow through the gas turbine engine to maintain a rated power output, e.g., thrust, without the need to increase the firing temperature. The rated power output, also the nameplate rating, defines the maximum amount of output power the gas turbine engine can produce under specific conditions designated by the manufacturer. An operational or second power output value of the gas turbine engine is maintained throughout the service life of the gas turbine engine by adjusting at least one of the area of the inlet assembly and the area of the first stage nozzle assembly using a controller of the gas turbine engine to facilitate increasing a mass flow rate of air through the gas turbine engine. The areas are adjusted by modifying at least one of an angle of inlet guide vanes and an angle of turbine nozzle vanes. Thus, the operational power output value, or operational thrust, of the gas turbine engine is maintained substantially equal to the rated power output, such that the rated power output is obtained by gas turbine engine during its service life, prior to scheduled off-line maintenance. As such, the embodiments described herein provide for reducing the rate at which the high pressure turbine components experience a decrease in service life as the gas turbine engine ages. Furthermore, the embodiments described herein provide for maintaining the gas turbine engine performance (i.e., thrust) without resorting to increasing the firing temperature as the gas turbine engine components age and deteriorate. In addition, the embodiments described herein provide for extending the operational period between maintenance repairs of the gas turbine engine so that repair costs over the life of the gas turbine engine are reduced.

Although generally described herein with respect to an aircraft gas turbine engine, the methods and systems described are applicable to any type or form of gas turbine engine, for example, without limitation, industrial gas turbine engines, turbojets, turbofans, and/or other turbine engines that generate hot exhaust gasses.

Figure 1:
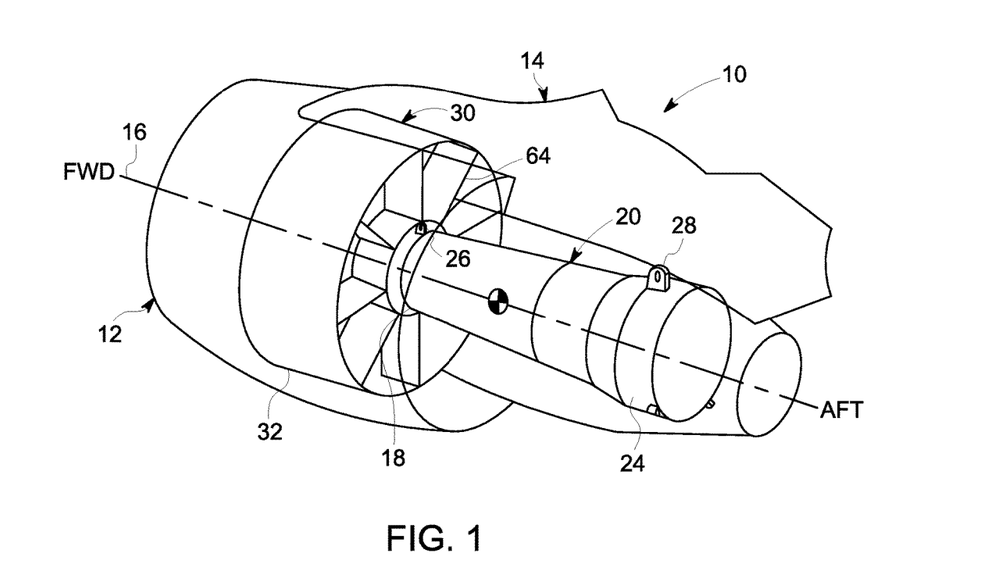
FIG. 1 is a schematic of an aircraft gas turbine engine mounted within a nacelle and mounted to an aircraft by a mounting structure or pylon.

FIG. 1 is a schematic of an aircraft gas turbine engine 10 mounted within a nacelle, generally indicated at 12, and mounted to an aircraft (not shown) by a mounting structure or pylon, generally indicated at 14. In the exemplary embodiment, gas turbine engine 10 is generally disposed about an engine centerline 16. Gas turbine engine 10 has a forward or fan hub frame 18 that is connected to a backbone structure or core engine 20, such that fan hub frame 18 is substantially coaxial with core engine 20 about engine centerline 16. Core engine 20 is further connected to an aft or turbine frame 24. Gas turbine engine 10 is attached to pylon 14, which generally extends downwardly from a wing of the aircraft (not shown) at a forward mount 26 on fan hub frame 18 and at an aft mount 28 on turbine frame 24. Alternatively, forward mount 26 may be coupled to any portion of gas turbine engine 10 that enables forward mount 26 to function as described herein, for example, without limitation, fan case 32.

Figure 2:
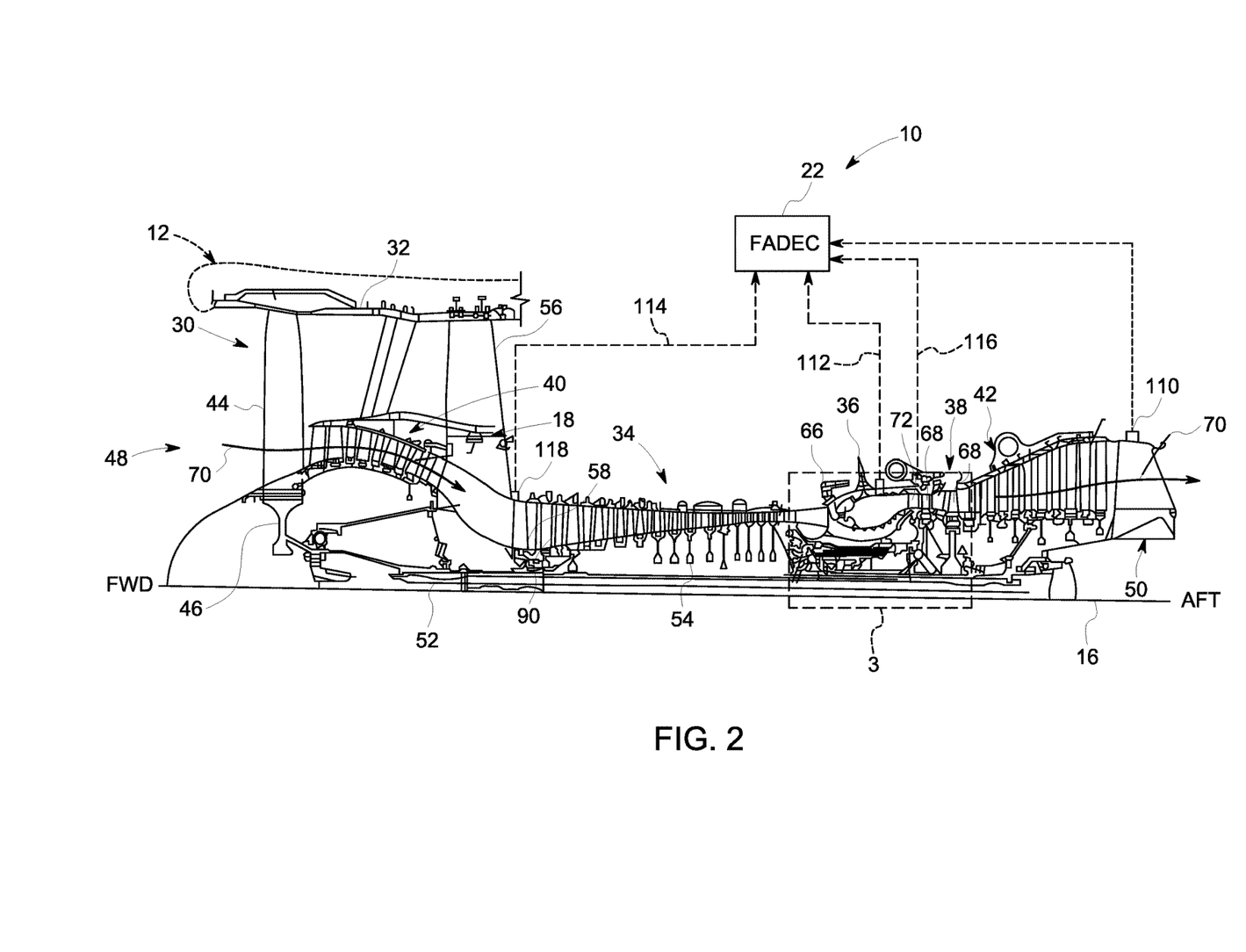
FIG. 2 is a sectional schematic illustrating the exemplary gas turbine engine shown in FIG. 1.

FIG. 2 is a sectional schematic illustrating, in detail, exemplary gas turbine engine 10. In the exemplary embodiment, gas turbine engine 10 includes core engine 20 having, in serial flow relationship, a high pressure compressor 34, a combustor 36 downstream from compressor 34, and a high pressure turbine 38 downstream from combustor 36. Furthermore, gas turbine engine 10 includes a controller, or a full authority digital electronic control (FADEC) 22. In the exemplary embodiment, FADEC 22 is configured to monitor and control aspects of the gas turbine engine 10 to counter degradation and/or reduction in performance, and specifically to facilitate maintaining a desired combustor discharge temperature (or firing temperature) and various other outputs in response to monitored feedback. Gas turbine engine 10 is, for example, without limitation, a two or three spool type gas turbine engine and includes a low pressure compressor 40 coupled together with fan assembly 30 and a low pressure turbine 42. Fan assembly 30 includes an array of fan blades 44 extending radially outward from a rotor disk 46. In addition, fan assembly 30 includes fan hub frame 18 having a plurality of fan frame struts or outlet guide vanes 56 that extend radially outward to fan case 32. Gas turbine engine 10 has an inlet assembly 48 and an exhaust 50 downstream from inlet assembly 48. Fan assembly 30 and low pressure compressor 40 are coupled by a low speed rotor shaft 52, and high pressure compressor 34 and high pressure turbine 38 are coupled by a high speed rotor shaft 54.

Figure 3:
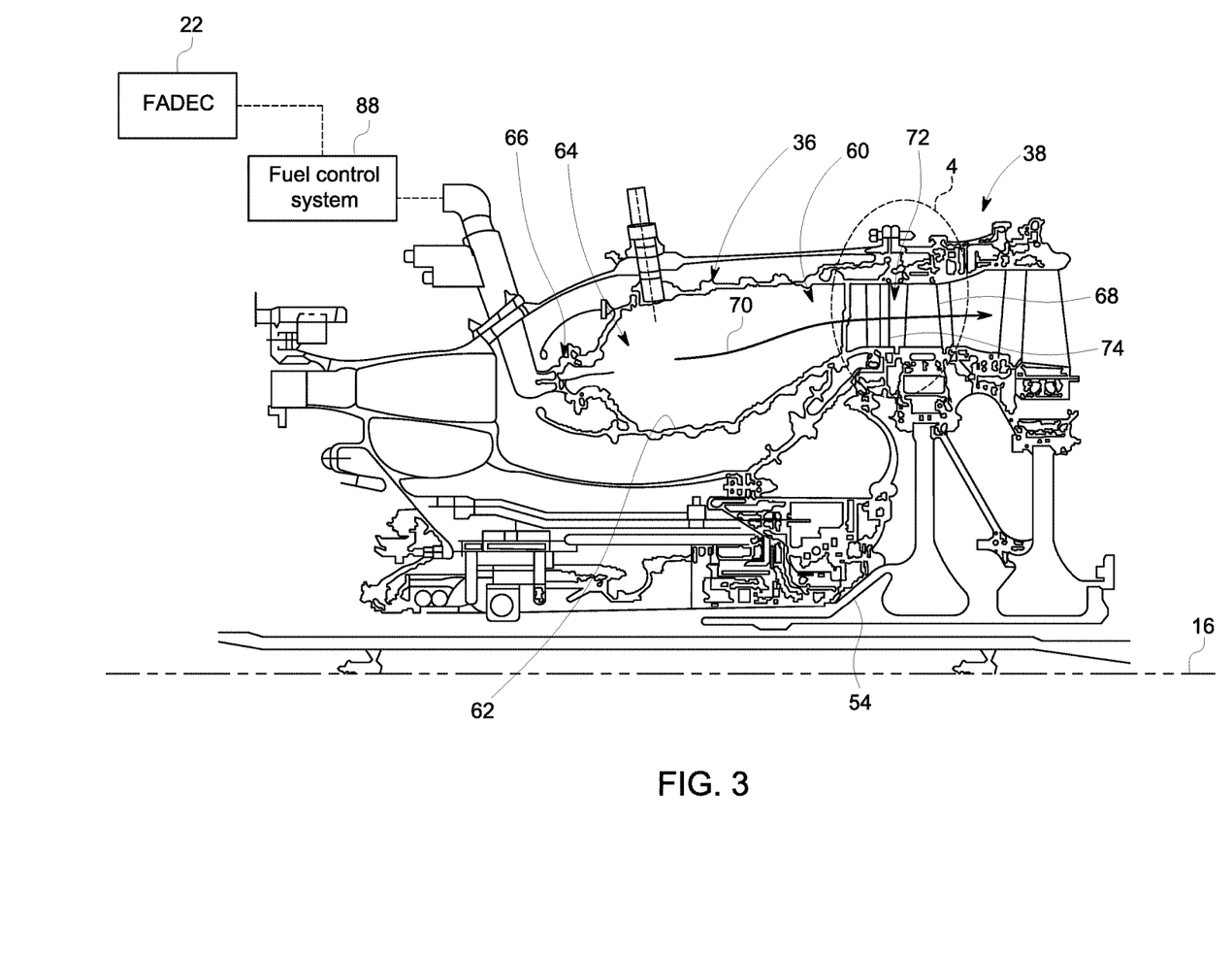
FIG. 3 is an enlarged view of a portion of FIG. 2 identified by area 3 and showing detail of a combustor of the gas turbine engine shown in FIG. 1.
Figure 4:
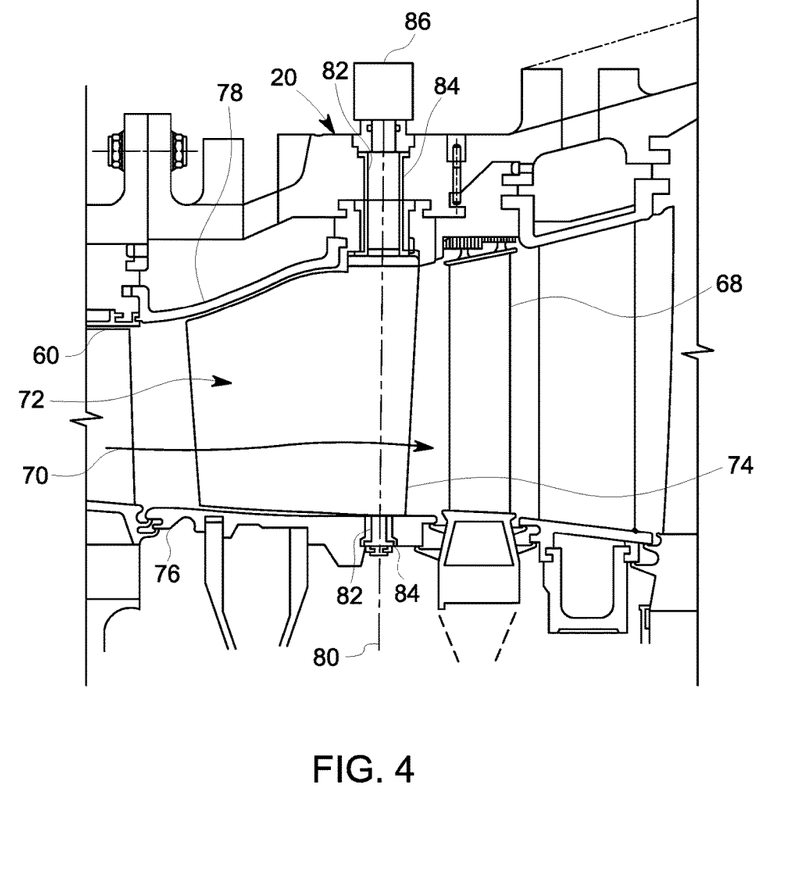
FIG. 4 is an enlarged view of a portion of FIG. 3 identified by area 4 and detailing a portion of a first stage turbine nozzle assembly of the gas turbine engine shown in FIG. 1.

FIG. 3 is an enlarged view of a portion of FIG. 2 identified by area 3 and showing detail of combustor 36. FIG. 4 is an enlarged view of a portion of FIG. 3 identified by area 4 and detailing a portion of a first stage turbine nozzle assembly 72. The phrase "first stage" as used herein means that the turbine nozzle assembly is the upstream-most turbine nozzle assembly, and is thus the first turbine nozzle assembly through which combustion gases or a fluid flow 70 passes through after exiting an outlet portion 60 of combustor 36. Similarly, turbine blades 68 shown in FIG. 4 are first-stage turbine blades.

In the exemplary embodiment, combustor 36 is one of several combustors that are circumferentially-spaced about core engine 20. Combustor 36 includes outlet portion 60 coupled at a downstream portion of combustor 36. Combustor 36 also includes a combustor liner 62 that defines a combustion chamber 64. Coupled to an end of combustor 36 is a fuel nozzle assembly 66. As shown in FIG. 3, outlet portion 60 extends between combustion chamber 64 and high pressure turbine 38 to direct hot combustion gases from combustor 36 to high pressure turbine 38.

A fuel control system 88 includes fuel nozzle assembly 66 coupled to each combustor 36. Fuel control system 88 regulates an amount of fuel flow from a fuel supply (not shown) to combustor 36, an amount of fuel split between primary and secondary fuel nozzles (not shown) of fuel nozzle assembly 66, and an amount of fuel mixed with secondary air flowing into combustor 36. In some embodiments, fuel control system 88 may also select a type of fuel for use in combustor 36. Gas turbine engine 10 may use liquid or gaseous fuel, such as kerosene-based fuels, natural gas, and/or a synthetic gas, to power gas turbine engine 10. Fuel control system 88 may be a separate unit or may be a component of FADEC 22.

High pressure turbine 38 includes a plurality of first stage turbine blades 68, or buckets, extending from high speed rotor shaft 54. Turbine blades 68 extend radially from high speed rotor shaft 54 and, under force of fluid flow 70, rotate high speed rotor shaft 54. First stage turbine nozzle assembly 72 is located upstream of turbine blades 68 and includes a plurality of turbine nozzle vanes 74 configured to direct fluid flow 70 toward turbine blades 68 at a desired angle. In the exemplary embodiment, turbine nozzle vanes 74 have an airfoil shape in cross-section. Alternatively, turbine nozzle vanes 74 have any cross-sectional shape that enables gas turbine engine 10 to function as described herein. In a traditional gas turbine engine, turbine nozzle vanes 74 are immoveable and are fixedly coupled between an inner surface 76 and an outer surface 78 of core engine 20, thereby fixing the total area of first stage turbine nozzle assembly 72. Turbine nozzle vanes 74 are configured to accommodate specific operational conditions of gas turbine engine 10, for example, without limitation, temperature and engine mass flow.

In the exemplary embodiment, however, turbine nozzle vanes 74 are moveable about a rotation axis 80. As shown in FIG. 4, turbine nozzle vanes 74 include an shaft portion 82 disposed on either end of turbine nozzle vane 74, proximate inner surface 76 and an outer surface 78 of core engine 20. That is, shaft portion 82 extends from a radially inward and radially outward end of turbine nozzle vane 74. Each of inner surface 76 and outer surface 78 includes a plurality of holes 84 therethrough, which are configured to accept shaft portions 82 of turbine nozzle vanes 74. A turbine nozzle vane actuator 86 is operably coupled to a radially outward end of turbine nozzle vane 74.

In the exemplary embodiment, turbine nozzle vane actuator 86 actuates a rotation of turbine nozzle vane 74 about rotation axis 80. The rotation of turbine nozzle vane 74 varies an amount of surface area of turbine nozzle vane 74 that is exposed to fluid flow 70. In one embodiment, turbine nozzle vane actuator 86 is an electric motor coupled to FADEC 22 for receiving command signals to actuate rotation of turbine nozzle vane 74 from a first position to a second position, different than the first. Alternatively, turbine nozzle vane actuator 86 may include mechanical linkage (not shown) that couples a plurality of turbine nozzle vanes 74 together to a single electric motor (not shown), which is configured to receive command signals for controlling rotation movement of the plurality of turbine nozzle vanes 74. By rotating turbine nozzle vanes 74, FADEC 22 facilitates efficient operation of gas turbine engine 10 at a given set of operational conditions, for example, without limitation, ambient conditions, firing temperature, engine mass flow, and load requirements, among others.

As described herein, as fluid flow 70 passes through high pressure turbine 38, the fluid forces turbine blades 68 within high pressure turbine 38 to rotate high speed rotor shaft 54 along centerline 16 of gas turbine engine 10. high speed rotor shaft 54 is connected to various components of gas turbine engine 10, including high pressure compressor 34. With reference to FIG. 2, high pressure compressor 34 includes a plurality of compressor blades 90 coupled to high speed rotor shaft 54. As high speed rotor shaft 54 rotates, compressor blades 90 within high pressure compressor 34 also rotate, thereby compressing fluid flow 70 from inlet assembly 48. Inlet assembly 48 channels fluid flow 70 through a plurality of inlet guide vanes (IGVs) 58, which control the amount of fluid flow 70 that is channeled to high pressure compressor 34. In the exemplary embodiment, IGVs 58 extend substantially radially outward from high speed rotor shaft 54 and are disposed at an angle with respect to fluid flow 70. In one embodiment, the angle of IGVs 58 can be increased or decreased by FADEC 22 to allow less or more fluid flow 70 into high pressure compressor 34, in a manner similar to turbine nozzle vanes 74 and known in the art.

Figure 5:
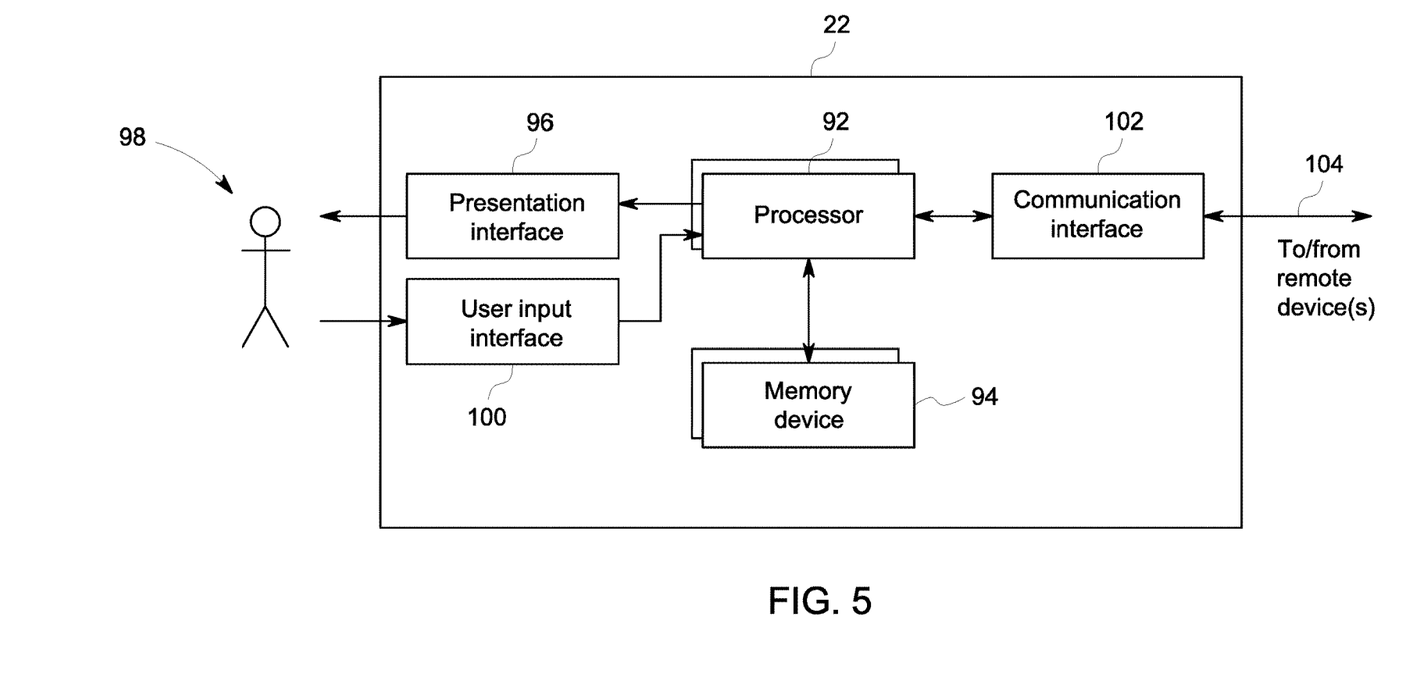
FIG. 5 is a block diagram of a controller for use with the gas turbine engine shown in FIG. 1.

FIG. 5 is a block diagram of FADEC 22 for use with gas turbine engine 10 shown in FIG. 1. In the exemplary embodiment, FADEC 22 includes a processor 92 for executing instructions. In some implementations, executable instructions are stored in a memory device 94. Processor 92 includes one or more processing units (e.g., in a multi-core configuration). Memory device 94 is any device allowing information such as executable instructions and/or other data to be stored and retrieved. Memory device 94 stores parameters for controlling the operation of gas turbine engine 10, as described in more detail herein. Memory device 94 includes one or more computer-readable media.

In the exemplary embodiment, FADEC 22 includes at least one presentation interface 96 component for presenting information to a user 98. Presentation interface 96 is any component capable of conveying information to user 98. In some implementations, presentation interface 96 includes an output adapter such as a video adapter and/or an audio adapter. The output adapter is operatively coupled to processor 92 and operatively coupleable to an output device such as a display device (e.g., a liquid crystal display (LCD), one or more light emitting diodes (LED), an organic light emitting diode (OLED) display, cathode ray tube (CRT), or "electronic ink" display) or an audio output device (e.g., a speaker or headphones). In some embodiments, the output device is a remote device, and presentation interface 96 is configured to enable communication through a short range wireless communication protocol such as Bluetooth™ or Z-Wave™, through a wireless local area network (WLAN) implemented pursuant to an IEEE (Institute of Electrical and Electronics Engineers) 802.11 standard (i.e., WiFi), and/or through a mobile phone (i.e., cellular) network (e.g., Global System for Mobile communications (GSM), 3G, 4G) or other mobile data network (e.g., Worldwide Interoperability for Microwave Access (WIMAX)), or a wired connection (i.e., one or more conductors for transmitting electrical signals). In other embodiments, FADEC 22 does not include presentation interface 96.

FADEC 22 includes a user input interface 100 for receiving input from user 98. User input interface 100 may include, for example, without limitation, one or more buttons, a keypad, a touch sensitive panel (e.g., a touch pad or a touch screen), and/or a microphone. A single component such as a touch screen may function as both an output device of presentation interface component 96 and user input interface 100. Some embodiments of FADEC 22 do not include user input interface 100.

In the exemplary embodiment, FADEC 22 includes a communication interface 102, which is communicatively coupleable to one or more remote devices 104, for example, without limitation, temperature sensors. In some embodiments, communication interface 102 is configured to enable communication through a short range wireless communication protocol such as Bluetooth™ or Z-Wave™, through WiFi, and/or through a mobile phone (i.e., cellular) network (e.g., Global System for Mobile communications (GSM), 3G, 4G) or other mobile data network (e.g., WIMAX), or a wired connection (i.e., one or more conductors for transmitting electrical signals). In embodiments that communication interface 102 couples FADEC 22 to one or more temperature sensors, communication interface 102 may include, for example, one or more conductors for transmitting electrical signals and/or power to and/or from the temperature sensors.

Referring to FIGS. 2-5, in the exemplary embodiment, FADEC 22 is be used to control the operation of gas turbine engine 10 to facilitate increasing the operating durability of gas turbine engine 10. For example, without limitation, FADEC 22 is used to monitor and adjust various parameters of gas turbine engine 10. In particular, FADEC 22 includes instructions stored in memory device 94 and executable on processor 92. FADEC 22 communicates with multiple sensors, which include an exhaust gas temperature sensor 110, a firing temperature sensor 112, an IGV angle sensor 114, and a turbine nozzle vane angle sensor 116 to monitor various operational conditions of gas turbine engine 10. Further, FADEC 22 interacts with turbine nozzle vane actuator 86 and an IGV actuator 118 to adjust operation of gas turbine engine 10, as described in detail below. Instructions stored on memory device 94 are specifically designed to carry out various monitoring, analysis, and control functions of the disclosed embodiments of gas turbine engine 10.

During operation, fluid flow 70 flows axially through nacelle 12 and fan assembly 30 in a direction that is substantially parallel to engine centerline 16, which extends through gas turbine engine 10. Fluid flow 70 is supplied to low pressure compressor 40 where it is compressed a first amount and directed to high pressure compressor 34 through inlet guide vanes 58. High pressure compressor 34 further compresses fluid flow 70 and delivers it to combustor 36 where it is burned with a fuel (not shown) to generate a combustion gas flow, or hot fluid flow 70. Hot fluid flow 70 from combustor 36 is directed to high pressure turbine 38 through first stage turbine nozzle assembly 72, and is further directed to low pressure turbine 42, where it generates a thrust load (not shown). High pressure turbine 38 drives high pressure compressor 34 by way of high speed rotor shaft 54 and low pressure turbine 42 drives fan assembly 30 by way of low speed rotor shaft 52.

Figure 6:
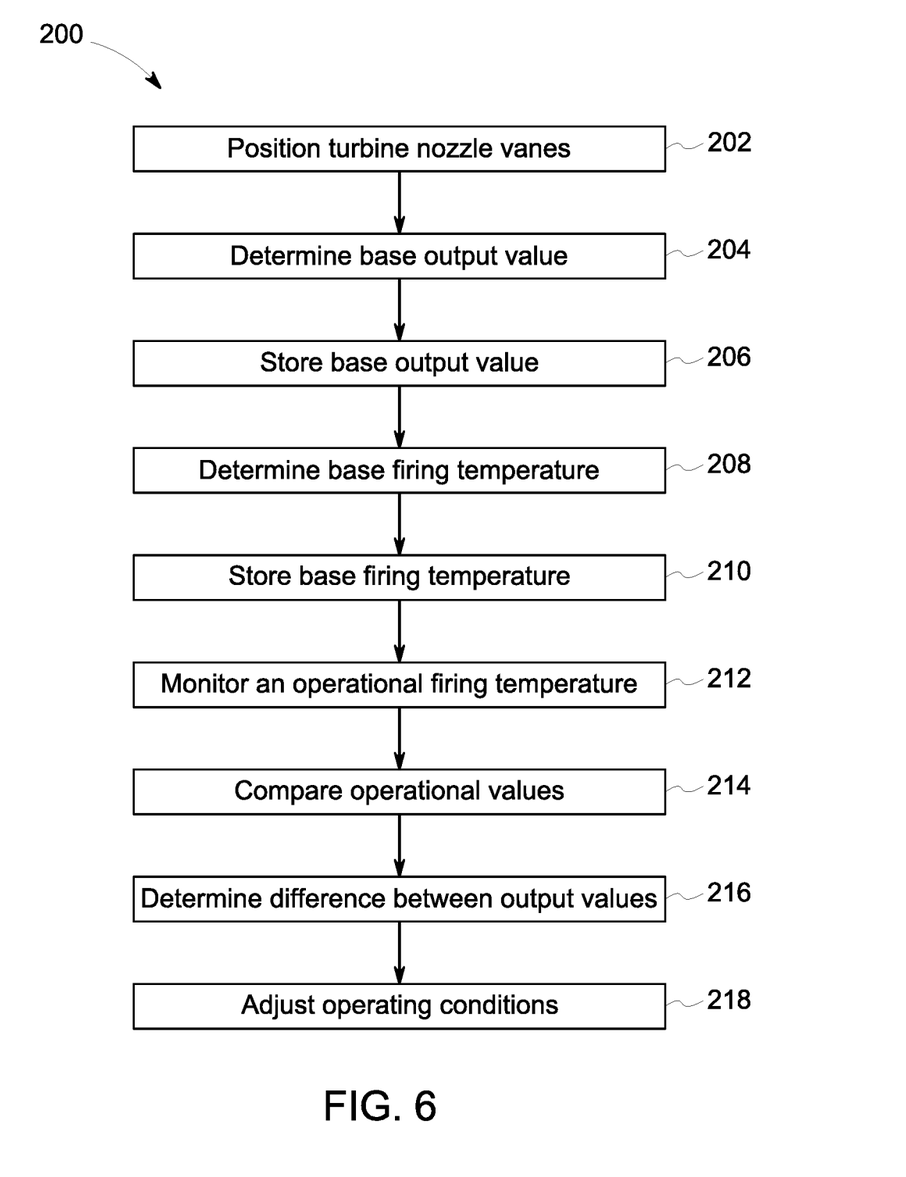
FIG. 6 is a flow diagram of an exemplary method for maintaining the output of the gas turbine engine shown in FIG. 1 throughout the service life of the gas turbine engine without increasing the firing temperature beyond a base firing temperature.

FIG. 6 is a flow diagram of a method 200 for maintaining the output of gas turbine engine 10 (shown in FIG. 1) throughout the life of gas turbine engine 10 without increasing the firing temperature beyond a base firing temperature rating or threshold, thereby improving the efficiency and durability of gas turbine engine 10. The base firing temperature rating is the nameplate rating given to gas turbine engine 10 by the manufacturer. For example, the nameplate rating defines the firing temperature of gas turbine engine 10 at the maximum rated output power of gas turbine engine 10, under specific conditions designated by the manufacturer. In the exemplary embodiment, method 200 includes instructions programmed or stored in memory device 94 (shown in FIG. 5) and executable by processor 92 (shown in FIG. 5) of FADEC 22 (shown in FIG. 1). The steps of method 200 include such instructions, and also utilize for example, without limitation, sensor feedback, mathematical algorithms and models, historical data, and look-up tables.

When new, or newly overhauled, gas turbine engine 10 produces a maximum rated power output, for example, without limitation, during takeoff of an aircraft. During the useful life of gas turbine engine 10, various internal components (e.g., compressor blades 90 and turbine blades 68 (each shown in FIG. 1)) of gas turbine engine 10 degrade or deteriorate, resulting in decreasing power output and efficiency of gas turbine engine 10. Method 200 facilitates maintaining the rated power output of gas turbine engine 10 without increasing the firing temperature of gas turbine engine 10 beyond the base firing temperature rating, or threshold. Increasing the firing temperature has the adverse effect of increasing the rate at which gas turbine engine 10 degrades or deteriorates. Furthermore, method 200 facilitates reducing the rate at which turbine blades 68 experience a decrease in service life as gas turbine engine 10 ages, by reducing the rate at which the firing temperature is increased. An advantage of maintaining the output of gas turbine engine 10 without increasing the firing temperature is extending the operational period of gas turbine engine 10 before off-line, or off-wing, repairs, thereby reducing the repair costs over the life of gas turbine engine 10.

In the exemplary embodiment, during initial operation of new or newly overhauled gas turbine engine 10 at the beginning of its service life (the initial condition of gas turbine engine 10), turbine nozzle vanes 74 (shown in FIG. 4) are rotated 202 to present the smallest or minimum amount of area of first stage turbine nozzle assembly 72 (shown in FIG. 4) to fluid flow 70 (shown in FIG. 4). The angle position is recorded or stored in memory device 94 of FADEC 22 as corresponding to the initial condition, or maximum rated power output of gas turbine engine 10. Furthermore, this position represents the configuration of first stage turbine nozzle assembly 72 that enables a minimum amount of fluid flow 70 to pass through first stage turbine nozzle assembly 72. A first power output value, i.e., a base power output value during, for example, without limitation, commissioning of gas turbine engine 10, is determined 204 for gas turbine engine 10. For example, without limitation, the base power output value may be the maximum rated power output or thrust of gas turbine engine 10. The base power output value is recorded or stored 206 in memory device 94 of FADEC 22 for later retrieval and to be compared to a second, or operational power output value obtained by FADEC 22 as gas turbine engine 10 degrades during its operational life.

In the exemplary embodiment, a base firing temperature is determined 208 for gas turbine engine 10 at the initial condition of gas turbine engine 10, or the base power output configuration. For example, without limitation, the base firing temperature may be the base firing temperature rating of gas turbine engine 10 as determined by the manufacturer of gas turbine engine 10. The base firing temperature is recorded or stored 210 in memory device 94 of FADEC 22 to be compared to operational firing temperatures obtained by FADEC 22 as gas turbine engine 10 degrades during its operational life.

In the exemplary embodiment, as gas turbine engine 10 is in operation, FADEC 22 monitors 212 a second or an operational firing temperature (i.e., an actual firing temperature) of gas turbine engine 10 at a current condition of gas turbine engine 10. In the exemplary embodiment, the firing temperature is determined by measuring (211) the exhaust gas temperature of gas turbine engine 10 and calculating the firing temperature based on the measured exhaust gas temperature. The exhaust gas temperature is measured at one or more of the exit of the low pressure turbine and the inlet of the low pressure turbine. In the exemplary embodiment, FADEC 22 compares 214 the operational firing temperature obtained at the current condition to the base firing temperature. During operation, when FADEC 22 determines or senses 216 that a difference between the operational firing temperature and the base firing temperature is greater than a threshold value, at least one operational condition of gas turbine engine 10 is adjusted 218 such that the operational firing temperature of gas turbine engine 10 is adjusted to be substantially equal to the base firing temperature. In other words, the operational conditions may be adjusted to regulate the operational firing temperature of gas turbine engine 10 to keep the value relatively constant and substantially equal to the base firing temperature, resulting in increased durability of the gas turbine engine 10 over time and longer operational service time before requiring maintenance.

In the exemplary embodiment, the adjustable operational condition includes adjusting an angle of turbine nozzle vanes 74 as controlled by turbine nozzle vane actuator 86 (shown in FIG. 4). Alternatively, the adjustable operational conditions include adjusting an exhaust gas temperature of fluid flow 70 measured by exhaust gas temperature sensor 110 (shown in FIG. 1), a fuel flow rate as controlled by fuel control system 88 (shown in FIG. 3), fuel composition (e.g., one or more fuels), fuel heating value, oxygen content of oxidant (e.g., air, oxygen enriched air, oxygen reduced air, or pure oxygen), fuel-air ratio, fuel temperature, combustion dynamics, an emissions flow rate, or any combination thereof. In the exemplary embodiment, when the operational firing temperature is greater than the base firing temperature, FADEC 22 increases the amount of fluid flow 70 supplied to combustor 36 (shown in FIG. 1) to increase the total mass flow through gas turbine engine 10. Specifically, FADEC 22 actuates turbine nozzle vane actuator 86 to open turbine nozzles vanes 74 until the operational firing temperature is below or substantially equal to the base firing temperature. Thus, the operational power output of gas turbine engine 10 is substantially maintained such that the operational power output is substantially equal to the base power output without the need to increase the operational firing temperature. This facilitates reducing the rate at which turbine blades 68 experience a decrease in service life as gas turbine engine 10 ages, by reducing the rate at which the operational firing temperature is increased. However, geometrically and/or physically imposed operating limits of turbine nozzle vanes 74 limit the allowable range for the adjustable operational conditions to protect against accelerated component degradation and to preserve product life. After FADEC 22 has actuated turbine nozzle vane actuator 86 to open turbine nozzles vanes 74 to their maximum open position, in one embodiment, the operational firing temperature is increased to maintain the operational power output until gas turbine engine 10 must be taken out of service for maintenance.

In alternative embodiments, when the operational power output is less than the base power output, FADEC 22 increases the operational firing temperature of combustor 36 to increase the energy of fluid flow 70 entering high pressure turbine 38, thereby increasing the operational power output or thrust of gas turbine engine 10. However, the operational firing temperature is not increased beyond the base firing temperature until turbine nozzle vanes 74 have reached their operating limit. In an alternative embodiment, FADEC 22 increases the temperature measured at the exhaust 22, which may also generally result from increasing the firing temperature. Operating limits (e.g., pressure, temperature, speed limits, etc.) of gas turbine engine 10 components limit the allowable range for the adjustable operational conditions to protect against accelerated component degradation and preserve product life. For example, combustor 36 materials limit the maximum operational firing temperature. Although the embodiments disclosed above are described with respect to increasing the operational power output of gas turbine engine 10 while maintaining the operational firing temperature below or substantially equal to the base firing temperature, the above described adjustments may be applied to decrease the operational power output and operational firing temperature, such as on a cold day.

Figure 7:
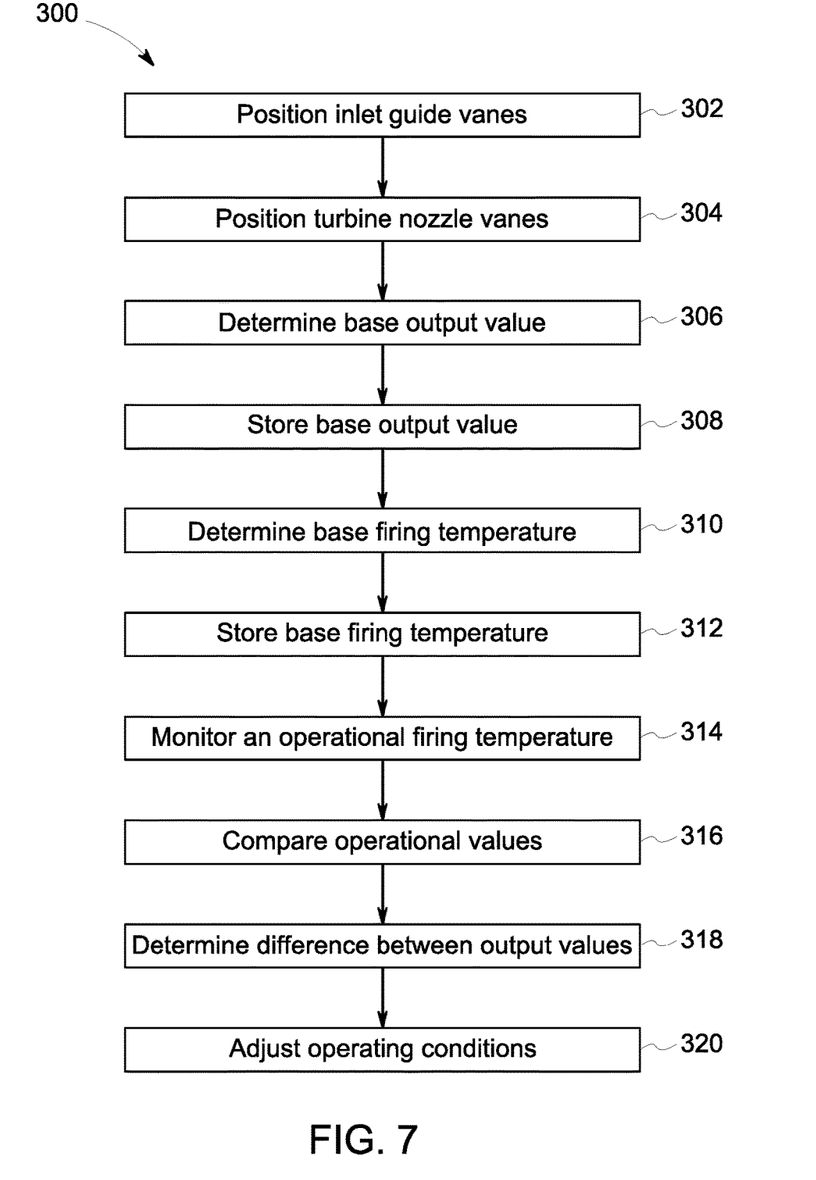
FIG. 7 is a flow diagram of an alternative method for maintaining the output of the gas turbine engine shown in FIG. 1 throughout the service life of the gas turbine engine without increasing the firing temperature beyond a base firing temperature.

FIG. 7 is a flow diagram of an alternative method 300 for maintaining the output of gas turbine engine 10 (shown in FIG. 1) throughout the life of gas turbine engine 10 without increasing the firing temperature beyond a base firing temperature value, thereby improving the efficiency and durability of gas turbine engine 10. In the exemplary embodiment, method 300 includes instructions programmed or stored in memory device 94 (shown in FIG. 5) and executable by processor 92 (shown in FIG. 5) of FADEC 22 (shown in FIG. 1). The steps of method 300 include such instructions, and also utilize for example, without limitation, sensor feedback, mathematical algorithms and models, historical data, and look-up tables.

As with method 200 (shown in FIG. 6), exemplary method 300 facilitates maintaining the output of gas turbine engine 10 without increasing the firing temperature of gas turbine engine 10 beyond a base firing temperature value. Method 300 facilitates reducing the rate at which turbine blades 68 (shown in FIG. 1) experience a decrease in service life as gas turbine engine 10 ages, by reducing the rate at which the firing temperature is increased. An advantage of maintaining the output of gas turbine engine 10 without increasing the firing temperature is an increase in the use time of gas turbine engine 10 before off-line, or off-wing, repairs, thereby reducing the repair costs over the life of gas turbine engine 10.

In the exemplary embodiment, during initial operation of gas turbine engine 10 at the beginning of its service life, inlet guide vanes (IGVs) 58 (shown in FIG. 2) and turbine nozzle vanes 74 (shown in FIG. 4) are positioned 302, 304 to present the smallest area of inlet assembly 48 (shown in FIG. 2) and first stage turbine nozzle assembly 72 (shown in FIG. 4) respectively to fluid flow 70 (shown in FIG. 4). The ability of FADEC 22 to rotate both IGVs 58 and turbine nozzle vanes 74 facilitates operating gas turbine engine 10 within predetermined mechanical speed limits of gas turbine engine 10, i.e., gas turbine engine 10 is operated away from physical speed limits and corrected core speed limits of one or more of the low pressure spool speed and the high pressure spool speed. For example, without limitation, if the fuel flow is increased, the firing temperature and the gas turbine engine speed increase. If a speed limit of gas turbine engine 10 is reached, FADEC 22 can modulate one or more of IGVs 58 and turbine nozzle vanes 74 to keep gas turbine engine 10 from exceeding the speed limit. In the exemplary embodiment, the positions of both the IGVs and the turbine nozzle vanes 74 are recorded or stored in FADEC 22 as corresponding to the maximum power output of gas turbine engine 10. A base power output is determined 306 for gas turbine engine 10. For example, without limitation, the base power output may be the rated power output or thrust of gas turbine engine 10. The base power output is recorded or stored 308 in memory device 94 of FADEC 22 to be compared to operational power outputs obtained by FADEC 22 as gas turbine engine 10 degrades during its operational life.

In the exemplary embodiment, a base firing temperature is determined 310 for gas turbine engine 10 at the base power output configuration. The firing temperature is determined by measuring (309) the exhaust temperature of gas turbine engine 10 and calculating the firing temperature based on the measured exhaust temperature. The base firing temperature is recorded or stored 312 in memory device 94 of FADEC 22 to be compared to operational firing temperatures obtained by FADEC 22 as gas turbine engine 10 degrades during its operational life.

In the exemplary embodiment, as gas turbine engine 10 is in operation, FADEC 22 monitors 314 an operational firing temperature (i.e., an actual firing temperature) of gas turbine engine 10. FADEC 22 compares 316 the operational firing temperatures obtained to the base firing temperature. During operation, when FADEC 22 determines or senses 318 that a difference between the operational firing temperature and the base firing temperature is greater than a threshold value, at least one operational condition of gas turbine engine 10 is adjusted 320 such that the operational firing temperature of gas turbine engine 10 is adjusted to be substantially equal to the base firing temperature. In other words, the operational conditions may be adjusted to regulate the operational firing temperature of gas turbine engine 10 to keep the value relatively constant and substantially equal to the base firing temperature, resulting in increased durability of the gas turbine engine 10 over time and longer operational time before required maintenance.

In the exemplary embodiment, the adjustable operational condition includes adjusting an angle of IGVs 58 as controlled by IGV actuator 118 (shown in FIG. 1), and adjusting an angle of turbine nozzle vanes 74 a corresponding amount as controlled by turbine nozzle vane actuator 86 (shown in FIG. 4). Alternatively, the adjustable operational conditions include adjusting an exhaust gas temperature of fluid flow 70 measured by exhaust temperature gas sensor 110 (shown in FIG. 1), a fuel flow rate as controlled by fuel control system 88 (shown in FIG. 3), fuel composition (e.g., one or more fuels), fuel heating value, oxygen content of oxidant (e.g., air, oxygen enriched air, oxygen reduced air, or pure oxygen), fuel-air ratio, fuel temperature, combustion dynamics, an emissions flow rate, or any combination thereof. In the exemplary embodiment, when the operational firing temperature is greater than the base firing temperature, FADEC 22 increases the amount of fluid flow 70 supplied to combustor 36 (shown in FIG. 1) to increase the total mass flow through gas turbine engine 10. FADEC 22 actuates IGV actuator 118 to open IGVs 58 and also actuates turbine nozzle vane actuator 86 to open turbine nozzles vanes 74 a corresponding amount until the operational firing temperature is substantially equal to the base firing temperature. Thus, the operational power output of gas turbine engine 10 is substantially maintained such that the operational power output is substantially equal to the base power output without the need to increase the operational firing temperature. This facilitates reducing the rate at which turbine blades 68 experience a decrease in service life as gas turbine engine 10 ages, by reducing the rate at which the operational firing temperature is increased. However, geometrically and/or physically imposed operating limits of IGVs 58 and turbine nozzles vanes 74 limit the allowable range for the adjustable operational conditions to protect against accelerated component degradation and to preserve product life.

In alternative embodiments, gas turbine engine 10 can be operated in a derated condition, i.e., in a condition such that the required power output is less than the rated output, or nameplate rating, of gas turbine engine 10. Generally, gas turbine engine 10 does not derate itself automatically or autonomously. The terms "derate", "derating", "derated", and similar grammatical variations, as used herein, includes a factor or value corresponding to the rated power output, or nameplate rating, of gas turbine engine 10. When gas turbine engine 10 is operated in a derated condition, a reduction or curtailment in the amount of power produced by gas turbine engine 10 is requested. FADEC 22 includes a cycle deck of gas turbine engine 10 operating parameters, and thus includes a threshold firing temperature for a variety of operating conditions. When gas turbine engine 10 is operated in a derated condition, the exhaust gas temperature is measured and a firing temperature is determined therefrom. The firing temperature is compared to the threshold firing temperature at the specific operating conditions of gas turbine engine 10. If the firing temperature exceeds the threshold value for the specific conditions, a user of gas turbine engine 10 can operate gas turbine engine 10 in a further derated condition, thereby facilitating decreasing the firing temperature requirements of gas turbine engine 10. Alternatively, FADEC 22 can increase the firing temperature up to the maximum firing temperature for gas turbine engine 10 by adjusting, for example, without limitation, an exhaust gas temperature of fluid flow 70 measured by exhaust gas temperature sensor 110 (shown in FIG. 2), a fuel flow rate as controlled by fuel control system 88 (shown in FIG. 3), fuel composition (e.g., one or more fuels), fuel heating value, oxygen content of oxidant (e.g., air, oxygen enriched air, oxygen reduced air, or pure oxygen), fuel-air ratio, fuel temperature, combustion dynamics, an emissions flow rate, or any combination thereof.

The embodiments described herein enable increasing the durability of a gas turbine engine by increasing a mass flow of a fluid flow through the gas turbine engine to maintain a rated power output, e.g., thrust, without the need to increase the firing temperature. Additionally, maintaining the rated power output without increasing the firing temperature of the gas turbine engine facilitates reducing the rate at which the high pressure turbine components experience a decrease in service life as the gas turbine engine ages. Furthermore, the embodiments described herein provide for maintaining the gas turbine engine performance (i.e., thrust) without resorting to increasing the firing temperature as the gas turbine engine components age and deteriorate. In addition, the embodiments described herein provide for extending the operational period between maintenance repairs of the gas turbine engine so that repair costs over the life of the gas turbine engine are reduced. In particular, at least one of the area of the inlet assembly and the area of the first stage nozzle assembly of the gas turbine engine are adjusted using a controller to facilitate increasing a mass flow rate of air through the gas turbine engine.

An exemplary technical effect of the methods and systems described herein includes increasing a mass flow of fluid flow 70 through gas turbine engine 10 to maintain a power output without the need to increase the firing temperature. Gas turbine engine 10 produces a maximum output and operates at a maximum efficiency when new and/or overhauled, which is referred to herein as the base power output. To preserve the durability of gas turbine engine 10, reduce maintenance cost, and extend the operational time period between maintenance repairs, it is desirable to maintain operation of gas turbine engine 10 at its base power output, without increasing firing temperature, which accelerates degradation of turbine components of gas turbine engine 10. The operational power output of gas turbine engine 10 is maintained throughout the product service life by adjusting at least one of the area of the inlet assembly and the area of the first stage nozzle assembly using FADEC 22. The operational conditions that are adjusted include at least one of the angle of IGVs 58 and the angle of turbine nozzle vanes 74. Thus, the operational power output of gas turbine engine 10 is maintained substantially equal to the base power output, such that a maximum power output or thrust is generated by gas turbine engine 10 prior to a scheduled off-line maintenance period.

Exemplary embodiments of a system and methods for increasing gas turbine engine durability are described above in detail. The system and methods described herein are not limited to the specific embodiments described, but rather, components of systems and/or steps of the methods may be utilized independently and separately from other components and/or steps described herein. For example, the methods may also be used in combination with other turbine engine systems and methods, and are not limited to practice with only the systems and methods, as is described herein. Rather, the exemplary embodiments can be implemented and utilized in connection with many turbine machine system applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of operating a gas turbine engine, said method comprising:

adjusting a first stage turbine nozzle assembly to a first position;

comparing a firing temperature to a threshold value and determining a difference value therefrom;

determining that the difference value exceeds the threshold value; and adjusting the first stage turbine nozzle assembly to a second position such that the firing temperature is substantially equal to the threshold value when the difference value exceeds the threshold value.

2. The method in accordance with claim 1, wherein adjusting the first stage turbine nozzle assembly to the first position comprises adjusting the first stage turbine nozzle assembly to a minimum flow area for a fluid flow.

3. The method in accordance with claim 2, wherein adjusting the first stage turbine nozzle assembly comprises rotating a turbine nozzle vane of the first stage turbine nozzle assembly to a first turbine angle position.

4. The method in accordance with claim 3, wherein adjusting the first stage turbine nozzle assembly to a second position comprises rotating the turbine nozzle vane to a second turbine angle position to increase mass flow through the gas turbine engine, wherein the second turbine angle position is different than the first turbine angle position.

5. The method in accordance with claim 2, wherein adjusting the first stage turbine nozzle assembly to the first position comprises rotating an inlet guide vane of an inlet assembly to a first inlet angle position.

6. The method in accordance with claim 5 further comprising rotating the inlet guide vane to a second inlet angle position to increase mass flow through the gas turbine engine, wherein the second inlet angle position is different than the first inlet angle position.

7. A method of operating a gas turbine engine, said method comprising:

operating the gas turbine engine at a first condition to generate a first power output;

comparing a firing temperature to a threshold value and determining a difference value therefrom;

determining that the difference value exceeds the threshold value; and derating the first power output of the gas turbine engine to a second power output, wherein the gas turbine engine is operated at a second condition such that the firing temperature is substantially equal to the threshold value when the difference value exceeds the threshold value.

8. The method in accordance with claim 7, wherein comparing the firing temperature to t threshold value comprises comparing the firing temperature to a conditional threshold value and determining a first difference value therefrom, wherein the conditional threshold value is based on the first condition of the gas turbine engine, and comparing the firing temperature to a maximum threshold value and determining a second difference value therefrom, wherein the threshold value is a maximum firing temperature rating of the gas turbine engine.

9. The method in accordance with claim 8 further comprising:

determining that the first difference value is less than the conditional threshold value; and adjusting the firing temperature such that the firing temperature is substantially equal to the conditional threshold value when the first difference value is less than the conditional threshold value.

10. A system for operating a gas turbine engine, said system comprising:

a gas turbine engine comprising a first stage turbine nozzle assembly; and a controller configured to control operation of said gas turbine engine, said controller comprising a processor programmed to:

adjust said first stage turbine nozzle assembly to a first position;

compare a firing temperature to a threshold value and determine a difference value therefrom;

determine that the difference value exceeds the threshold value; and adjust said first stage turbine nozzle assembly to a second position such that the firing temperature is substantially equal to the threshold value when the difference value exceeds the threshold value.

11. The system in accordance with claim 10, wherein said gas turbine engine further comprises a turbine nozzle vane coupled to said first stage nozzle assembly and a first actuator coupled to said turbine nozzle vane, wherein said first actuator is configured to adjust a rotation angle of said turbine nozzle vane.

12. The system in accordance with claim 11, wherein the processor is further programmed to adjust said first stage turbine nozzle assembly by actuating said first actuator to rotate said turbine nozzle vane to a first turbine angle position.

13. The system in accordance with claim 12, wherein the processor is further programmed to adjust said first stage turbine nozzle assembly by actuating said first actuator to rotate said turbine nozzle vane to a second turbine angle position to increase mass flow through said gas turbine engine, wherein said second turbine angle position is different than said first turbine angle position.

14. The system in accordance with claim 10, wherein said turbine gas engine further comprises a sensor configured to transmit an input signal to said controller.

15. The system in accordance with claim 14, wherein said sensor comprises at least one of an exhaust gas temperature sensor, a firing temperature sensor, an inlet guide vane angle sensor, and a turbine nozzle vane angle sensor.

16. The system in accordance with claim 10, wherein said gas turbine engine further comprises an inlet assembly comprising an inlet guide vane, and wherein said processor is further programmed to rotate the inlet guide vane to a second inlet angle position to increase mass flow through said gas turbine engine.

17. The system in accordance with claim 16, wherein said gas turbine engine further comprises a second actuator coupled to said inlet guide vane, wherein said second actuator is configured to adjust a rotation angle of said inlet guide vane.

* * * * *